United States Patent
Liu

(10) Patent No.: US 10,685,158 B2
(45) Date of Patent: Jun. 16, 2020

(54) LITHOGRAPHY MODEL FOR 3D FEATURES

(71) Applicant: ASML Netherlands B.V., Veldhoven (NL)

(72) Inventor: Peng Liu, Cupertino, CA (US)

(73) Assignee: ASML Netherlands B.V., Veldhoven (NL)

(*) Notice: Subject to any disclaimer, the term of this patent is extended or adjusted under 35 U.S.C. 154(b) by 503 days.

(21) Appl. No.: 15/529,908

(22) PCT Filed: Nov. 24, 2015

(86) PCT No.: PCT/EP2015/077482
§ 371 (c)(1),
(2) Date: May 25, 2017

(87) PCT Pub. No.: WO2016/096333
PCT Pub. Date: Jun. 23, 2016

(65) Prior Publication Data
US 2017/0262564 A1 Sep. 14, 2017

Related U.S. Application Data

(60) Provisional application No. 62/093,916, filed on Dec. 18, 2014.

(51) Int. Cl.
*G06F 30/367* (2020.01)
*G03F 7/20* (2006.01)
*G06F 119/18* (2020.01)

(52) U.S. Cl.
CPC ............ *G06F 30/367* (2020.01); *G03F 7/705* (2013.01); *G03F 7/70416* (2013.01);
(Continued)

(58) Field of Classification Search
None
See application file for complete search history.

(56) References Cited

U.S. PATENT DOCUMENTS 5,229,872 A 7/1993 Mumola
5,296,891 A 3/1994 Vogt et al.
(Continued)

FOREIGN PATENT DOCUMENTS

WO 2010/059954 5/2010

OTHER PUBLICATIONS

International Search Report dated Mar. 10, 2016 in corresponding International Patent Application No. PCT/EP2015/077482.
(Continued)

*Primary Examiner* — Suzanne Lo
(74) *Attorney, Agent, or Firm* — Pillsbury Winthrop Shaw Pittman LLP

(57) ABSTRACT

Disclosed herein is a computer-implemented method of image simulation for a device manufacturing process, the method comprising: identifying regions of uniform optical properties from a portion or an entirety of a substrate or a patterning device, wherein optical properties are uniform within each of the regions; obtaining an image for each of the regions, wherein the image is one that would be formed from the substrate if the entirety of the substrate or the patterning device has the same uniform optical properties as that region; forming a stitched image by stitching the image for each of the regions according to locations of the regions in the portion or the entirety of the substrate of the patterning device; forming an adjusted image by applying adjustment to the stitched image for at least partially correcting for or at least partially imitating an effect of finite sizes of the regions.

21 Claims, 19 Drawing Sheets

(52) U.S. Cl.
CPC ...... *G03F 7/70433* (2013.01); *G03F 7/70941* (2013.01); *G06F 2119/18* (2020.01)

(56) References Cited

U.S. PATENT DOCUMENTS

| | | | |
|---|---|---|---|
| 5,523,193 | A | 6/1996 | Nelson |
| 5,969,441 | A | 10/1999 | Loopstra et al. |
| 6,046,792 | A | 4/2000 | Van Der Werf et al. |
| 6,833,234 | B1* | 12/2004 | Bloomstein ............. B29C 64/40 264/401 |
| 7,003,758 | B2 | 2/2006 | Ye et al. |
| 7,587,704 | B2 | 9/2009 | Ye et al. |
| 8,200,468 | B2 | 6/2012 | Ye et al. |
| 8,438,508 | B2 | 5/2013 | Liu |
| 8,786,824 | B2 | 7/2014 | Hansen |
| 8,799,832 | B1* | 8/2014 | Granik ................ G03F 7/70441 716/53 |
| 9,235,662 | B2 | 1/2016 | Liu |
| 2010/0315614 | A1 | 12/2010 | Hansen |
| 2013/0042211 | A1* | 2/2013 | Liu .......................... G03F 7/705 716/53 |
| 2013/0204594 | A1* | 8/2013 | Liu ..................... G06F 17/5009 703/2 |

OTHER PUBLICATIONS

Liu, Peng, et al., "A full-chip 3D computational lithography framework", Proc. SPIE, vol. 8326, pp. 83260A-1-83260A-18 (2012).
Spence, Chris, "Full-Chip Lithography Simulation and Design Analysis—How OPC Is Changing IC Design," Proc. SPIE, vol. 5751, pp. 1-14 (2005).
Cao, Yu et al., "Optimized Hardware and Software for Fast, Full Chip Simulation," Proc. of SPIE, vol. 5754, pp. 407-414 (2005).
Rosenbluth, Alan E. et al., "Optimum mask and source patterns to print a given shape," J. Microlith., Microfab., Microsys., vol. 1, No. 1, pp. 13-30 (Apr. 2002).
Granik, Yuri, "Source optimization for image fidelity and throughput," J. Microlith., Microfab., Microsys., vol. 3, No. 4, pp. 509-522 (Oct. 2004).
Socha, Robert et al., "Simultaneous Source Mask Optimization (SMO)," Proc. of SPIE, vol. 5853, pp. 180-193 (2005).

* cited by examiner

LITHOGRAPHY MODEL FOR 3D FEATURES

CROSS-REFERENCE TO RELATED APPLICATIONS

This application is the U.S. national phase entry of PCT patent application no. PCT/EP2015/077482, which was filed on Nov. 24, 2015, which claims the benefit of priority of U.S. provisional patent application No. 62/093,916 which was filed on Dec. 18, 2014, and which is incorporated herein in its entirety by reference.

TECHNICAL FIELD

The description herein relates to lithographic apparatuses and processes, and more particularly to a method or tool for optimization of an illumination source or patterning device for use in a lithographic apparatus or process.

BACKGROUND

A lithographic apparatus can be used, for example, in the manufacture of integrated circuits (ICs). In such a case, a patterning device (e.g., a mask) may contain or provide a circuit pattern corresponding to an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic apparatus, one target portion at a time. In one type of lithographic apparatuses, the circuit pattern on the entire patterning device is transferred onto one target portion in one go; such an apparatus is commonly referred to as a wafer stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic apparatus will have a magnification factor M (generally <1), the speed F at which the substrate is moved will be a factor M times that at which the projection beam scans the patterning device. More information with regard to lithographic devices as described herein can be gleaned, for example, from U.S. Pat. No. 6,046,792, incorporated herein by reference.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, microlithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

SUMMARY

Disclosed herein is a computer-implemented method of image simulation for a device manufacturing process, the method comprising: identifying regions of uniform optical properties from a portion or an entirety of a substrate or a patterning device, wherein optical properties are uniform within each of the regions; obtaining an image for each of the regions, wherein the image is one that would be formed from the substrate if the entirety of the substrate or the patterning device has the same uniform optical properties as that region; forming a stitched image by stitching the image for each of the regions according to locations of the regions in the portion or the entirety of the substrate of the patterning device; forming an adjusted image by applying adjustment to the stitched image for at least partially correcting for or at least partially imitating an effect of finite sizes of the regions.

Also disclosed herein is a computer program product comprising a computer readable medium having instructions recorded thereon, the instructions when executed by a computer implementing the method above; a computer program product comprising a computer readable medium, having a database of images of regions of uniform optical properties recorded thereon; and a computer program product comprising a computer readable medium, having a database of kernel functions that represent physical effects of characteristics of regions of uniform optical properties.

BRIEF DESCRIPTION OF THE DRAWINGS

The above aspects and other aspects and features will become apparent to those ordinarily skilled in the art upon review of the following description of specific embodiments in conjunction with the accompanying figures, wherein:

FIG. 1B shows an EUV illumination source including a source collector module and illumination optics;

DETAILED DESCRIPTION

Figure 1A:
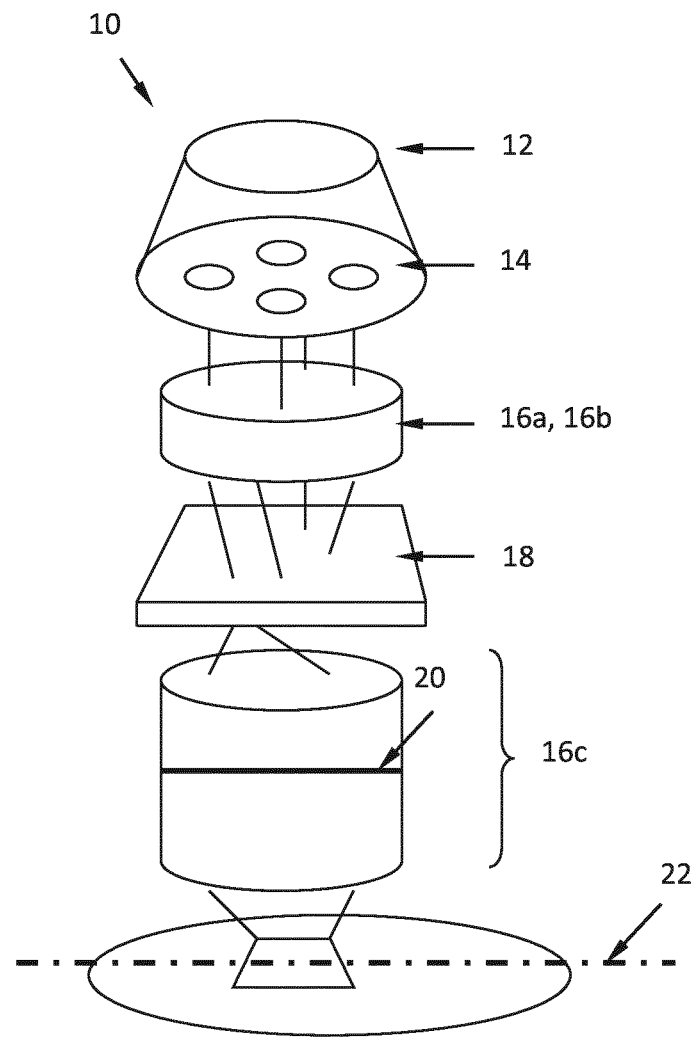
FIG. 1A is a block diagram of various subsystems of a lithography system according to an embodiment.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic apparatuses that project a design layout onto a substrate using illumination from a deep-ultraviolet (e.g., 13.52 nm) illumination source or an extreme-ultraviolet illumination source, creating individual functional elements having dimensions well below 30 nm.

This process in which features with dimensions smaller than the classical resolution limit of a lithographic apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic apparatus and/or design layout. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic apparatus, no matter where the optical component is located on an optical path of the lithographic apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

As an example, OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, especially in the context of lithography simulation/optimization, the term "mask," "patterning device" and "design layout" can be used interchangeably, as in lithography simulation/optimization, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another and/or non-geometrical optical effects such as diffraction and interference. Similarly, proximity effects may arise from diffusion and other chemical effects during post-exposure bake (PEB), resist development, and etching that generally follow lithography.

In order to ensure that the projected image of the design layout is in accordance with requirements of a given target circuit design, proximity effects need to be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

Application of model-based OPC to a target design involves good process models and considerable computational resources, given the many millions of features typically present in a chip design. However, applying OPC is generally not an exact science, but an empirical, iterative process that does not always compensate for all possible proximity effect. Therefore, effect of OPC, e.g., design layouts after application of OPC and any other RET, need to be verified by design inspection, i.e. intensive full-chip simulation using calibrated numerical process models, in order to minimize the possibility of design flaws being built into the patterning device pattern. This is driven by the enormous cost of making high-end patterning devices, which run in the multi-million dollar range, as well as by the impact on turn-around time by reworking or repairing actual patterning devices once they have been manufactured.

One of the simplest forms of OPC is selective bias. Given a CD vs. pitch curve, all of the different pitches could be forced to produce the same CD, at least at best focus and exposure, by changing the CD at the mask level. Thus, if a feature prints too small at the wafer level, the mask level feature would be biased to be slightly larger than nominal, and vice versa. Since the pattern transfer process from mask level to wafer level is non-linear, the amount of bias is not simply the measured CD error at best focus and exposure times the reduction ratio, but with modeling and experimentation an appropriate bias can be determined. Selective bias is an incomplete solution to the problem of proximity effects, particularly if it is only applied at the nominal process condition. Even though such bias could, in principle, be applied to give uniform CD vs. pitch curves at best focus and exposure, once the exposure process varies from the nominal condition, each biased pitch curve will respond differently, resulting in different process windows for the different features. Therefore, the "best" bias to give identical CD vs. pitch may even have a negative impact on the overall process window, reducing rather than enlarging the focus and exposure range within which all of the target features print on the wafer within the desired process tolerance.

Other more complex OPC techniques have been developed for application beyond the one-dimensional bias example above. A two-dimensional proximity effect is line end shortening. Line ends have a tendency to "pull back" from their desired end point location as a function of exposure and focus. In many cases, the degree of end shortening of a long line end can be several times larger than the corresponding line narrowing. This type of line end pull back can result in catastrophic failure of the devices being manufactured if the line end fails to completely cross over the underlying layer it was intended to cover, such as a polysilicon gate layer over a source-drain region. Since this type of pattern is highly sensitive to focus and exposure, simply biasing the line end to be longer than the design length is inadequate because the line at best focus and exposure, or in an underexposed condition, would be excessively long, resulting either in short circuits as the extended line end touches neighboring structures, or unnecessarily large circuit sizes if more space is added between individual features in the circuit. Since one of the key goals of integrated circuit design and manufacturing is to maximize the number of functional elements while minimizing the area required per chip, adding excess spacing is a highly undesirable solution.

Two-dimensional OPC approaches may help solve the line end pull back problem. Extra structures (also known as "assist features") such as "hammerheads" or "serifs" may be added to line ends to effectively anchor them in place and provide reduced pull back over the entire process window. Even at best focus and exposure these extra structures are not resolved but they alter the appearance of the main feature without being fully resolved on their own. A "main feature" as used herein means a feature intended to print on a wafer under some or all conditions in the process window. Assist features can take on much more aggressive forms than simple hammerheads added to line ends, to the extent the pattern on the mask is no longer simply the desired wafer pattern upsized by the reduction ratio. Assist features such as serifs can be applied to many more cases than simply reducing line end pull back. Inner or outer serifs can be applied to any edge, especially two dimensional edges, to reduce corner rounding or edge extrusions. With enough selective biasing and assist features of all sizes and polarities, the features on the mask bear less and less of a resemblance to the final pattern desired at the wafer level. In general, the mask pattern becomes a pre-distorted version of the wafer-level pattern, where the distortion is intended to counteract or reverse the pattern deformation that will occur during the lithographic process to produce a pattern on the wafer that is as close to the one intended by the designer as possible.

Another OPC technique involves using completely independent and non-resolvable assist features, instead of or in addition to those assist features (e.g., serifs) connected to the main features. The term "independent" here means that edges of these assist features are not connected to edges of the main features. These independent assist features are not intended or desired to print as features on the wafer, but rather are intended to modify the aerial image of a nearby main feature to enhance the printability and process tolerance of that main feature. These assist features (often referred to as "scattering bars" or "SBAR") can include sub-resolution assist features (SRAF) which are features outside edges of the main features and sub-resolution inverse features (SRIF) which are features scooped out from inside the edges of the main features. The presence of SBAR adds yet another layer of complexity to a mask. A simple example of a use of scattering bars is where a regular array of non-resolvable scattering bars is drawn on both sides of an isolated line feature, which has the effect of making the isolated line appear, from an aerial image standpoint, to be more representative of a single line within an array of dense lines, resulting in a process window much closer in focus and exposure tolerance to that of a dense pattern. The common process window between such a decorated isolated feature and a dense pattern will have a larger common tolerance to focus and exposure variations than that of a feature drawn as isolated at the mask level.

Both OPC and full-chip RET verification may be based on numerical modeling systems and methods as described, for example in, U.S. patent application Ser. No. 10/815,573 and an article titled "Optimized Hardware and Software For Fast, Full Chip Simulation", by Y. Cao et al., Proc. SPIE, Vol. 5754, 405 (2005).

One RET is related to adjustment of the global bias of the design layout. The global bias is the difference between the patterns in the design layout and the patterns intended to print on the substrate. For example, a circular pattern of 25 nm diameter may be printed on the substrate by a 50 nm diameter pattern in the design layout or by a 20 nm diameter pattern in the design layout but with high dose.

In addition to optimization to design layouts or patterning devices (e.g., OPC), the illumination source can also be optimized, either jointly with patterning device optimization or separately, in an effort to improve the overall lithography fidelity. The terms "illumination source" and "source" are used interchangeably in this document. Since the 1990s, many off-axis illumination sources, such as annular, quadrupole, and dipole, have been introduced, and have provided more freedom for OPC design, thereby improving the imaging results, As is known, off-axis illumination is a proven way to resolve fine structures (i.e., target features) contained in the patterning device. However, when compared to a traditional illumination source, an off-axis illumination source usually provides less radiation intensity for the aerial image (AI). Thus, it becomes desirable to attempt to optimize the illumination source to achieve the optimal balance between finer resolution and reduced radiation intensity.

Numerous illumination source optimization approaches can be found, for example, in an article by Rosenbluth et al., titled "Optimum Mask and Source Patterns to Print A Given Shape", Journal of Microlithography, Microfabrication, Microsystems 1(1), pp. 13-20, (2002). The source is partitioned into several regions, each of which corresponds to a certain region of the pupil spectrum. Then, the source distribution is assumed to be uniform in each source region and the brightness of each region is optimized for process window. However, such an assumption that the source distribution is uniform in each source region is not always valid, and as a result the effectiveness of this approach suffers. In another example set forth in an article by Granik, titled "Source Optimization for Image Fidelity and Throughput", Journal of Microlithography, Microfabrication, Microsystems 3(4), pp. 509-522, (2004), several existing source optimization approaches are overviewed and a method based on illuminator pixels is proposed that converts the source optimization problem into a series of non-negative least square optimizations. Though these methods have demonstrated some successes, they typically require multiple complicated iterations to converge. In addition, it may be difficult to determine the appropriate/optimal values for some extra parameters, such as γ in Granik's method, which dictates the trade-off between optimizing the source for substrate image fidelity and the smoothness requirement of the source.

For low $k_1$ photolithography, optimization of both the source and patterning device is useful to ensure a viable process window for projection of critical circuit patterns. Some algorithms (e.g. Socha et. al. Proc. SPIE vol. 5853, 2005, p. 180) discretize illumination into independent source points and mask into diffraction orders in the spatial frequency domain, and separately formulate a cost function (which is defined as a function of selected design variables) based on process window metrics such as exposure latitude which could be predicted by optical imaging models from source point intensities and patterning device diffraction orders. The term "design variables" as used herein comprises a set of parameters of a lithographic apparatus, for example, parameters a user of the lithographic apparatus can adjust. It should be appreciated that any characteristics of a lithographic projection process, including those of the source, the patterning device, the projection optics, and/or resist characteristics can be among the design variables in the optimization. The cost function is often a non-linear function of the design variables. Then standard optimization techniques are used to minimize the cost function.

Relatedly, the pressure of ever decreasing design rules have driven semiconductor chipmakers to move deeper into the low $k_1$ lithography era with existing 193 nm ArF lithography. Lithography towards lower $k_1$ puts heavy demands on RET, exposure tools, and the need for litho-friendly design. 1.35 ArF hyper numerical aperture (NA) exposure tools may be used in the future. To help ensure that circuit design can be produced on to the substrate with workable process window, source-patterning device optimization (referred to herein as source-mask optimization or SMO) is becoming a significant RET for 2× nm node.

A source and patterning device (design layout) optimization method and system that allows for simultaneous optimization of the source and patterning device using a cost function without constraints and within a practicable amount of time is described in a commonly assigned International Patent Application No. PCT/US2009/065359, filed on Nov. 20, 2009, and published as WO2010/059954, titled "Fast Freeform Source and Mask Co-Optimization Method", which is hereby incorporated by reference in its entirety.

Another source and patterning device optimization method and system that involves optimizing the source by adjusting pixels of the source is described in a commonly assigned U.S. patent application Ser. No. 12/813,456, filed on Jun. 10, 2010, and published as U.S. Patent Application Publication No. 2010/0315614, titled "Source-Mask Optimization in Lithographic Apparatus", which is hereby incorporated by reference in its entirety.

Although specific reference may be made in this text to the use of the embodiments in the manufacture of ICs, it should be explicitly understood that the embodiments has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle," "wafer" or "die" in this text should be considered as interchangeable with the more general terms "mask," "substrate" and "target portion," respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term "optimizing" and "optimization" as used herein mean adjusting a lithographic apparatus such that results and/or processes of lithography have more desirable characteristics, such as higher accuracy of projection of design layouts on a substrate, larger process windows, etc.

Further, the lithographic apparatus may be of a type having two or more substrate tables (and/or two or more patterning device tables). In such "multiple stage" devices the additional tables may be used in parallel, or preparatory steps may be carried out on one or more tables while one or more other tables are being used for exposures. Twin stage lithographic apparatuses are described, for example, in U.S. Pat. No. 5,969,441, incorporated herein by reference.

The patterning device referred to above comprise design layouts. The design layouts can be generated utilizing CAD (computer-aided design) programs, this process often being referred to as EDA (electronic design automation). Most CAD programs follow a set of design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. One of the goals in integrated circuit fabrication is to faithfully reproduce the original circuit design on the substrate (via the patterning device).

The term patterning device as employed in this text may be broadly interpreted as referring to generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The matrix addressing can be performed using suitable electronics. More information on such mirror arrays can be gleaned, for example, from U.S. Pat. Nos. 5,296,891 and 5,523,193, which are incorporated herein by reference.

a programmable LCD array. An example of such a construction is given in U.S. Pat. No. 5,229,872, which is incorporated herein by reference.

Figure 1B:
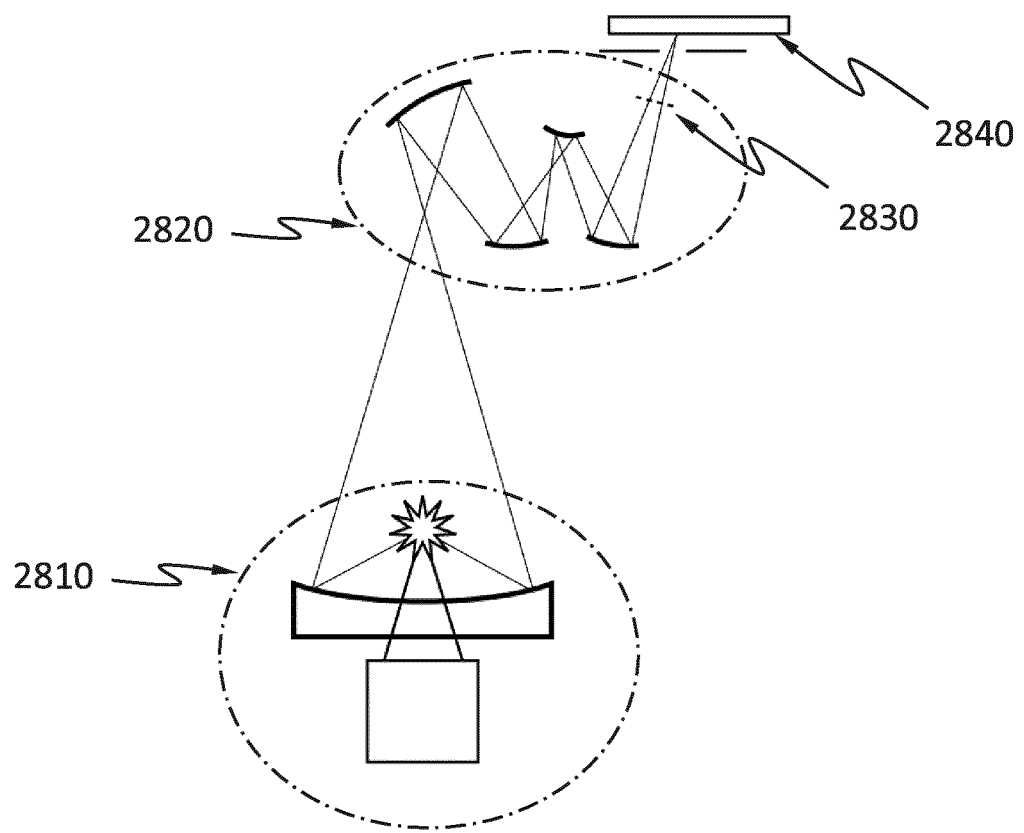
FIG. 1B shows a schematic of an illumination source.

As a brief introduction, FIG. 1A illustrates a lithographic apparatus. Major components are an illumination source 12, which may be a deep-ultraviolet excimer laser source or other type of sources including extreme ultra violet (EUV) sources, illumination optics which define the partial coherence (denoted as sigma) and which may include optics 14, 16a and 16b that shape radiation from the source 12; a patterning device (e.g., a mask or reticle) 18; and transmission optics 16c that project an image of the patterning device pattern onto a substrate plane 22. An adjustable filter or aperture 20 at the pupil plane of the projection optics may restrict the range of beam angles that impinge on the substrate plane 22, where the largest possible angle defines the numerical aperture of the projection optics NA=sin($\Theta_{max}$). The term "source" and "illumination source" as used herein may include illumination optics. For example, FIG. 1B shows an EUV illumination source including a source collector module 2810 and illumination optics 2820. In the source collector module 2810, EUV radiation may be produced by a plasma. The EUV radiation is then shaped by the illumination optics 2820 and directed to a patterning device 2840. A pupil at a plane between the patterning device 2840 and the illumination optics 2820 may be referred to as an illumination pupil. The "shape" of the illumination source refers to the intensity and/or phase distribution at the illumination pupil.

In a lithographic apparatus, a source provides illumination (i.e. radiation); projection optics direct and shapes the illumination via a patterning device and onto a substrate. The term "projection optics" is broadly defined here to include any optical component that may alter the wavefront of the radiation beam. For example, projection optics may include at least some of the components 14, 16a, 16b and 16c. An aerial image (AI) is the radiation intensity distribution on the substrate. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in commonly assigned U.S. patent application Ser. No. 12/315,849, disclosure of which is hereby incorporated by reference in its entirety. The resist model is related only to properties of the resist layer (e.g., effects of chemical processes which occur during exposure, PEB and development). Optical properties of the lithographic apparatus (e.g., properties of the source, the patterning device and the projection optics) dictate the aerial image. Since the patterning device used in the lithographic apparatus can be changed, it is desirable to separate the optical properties of the patterning device from the optical properties of the rest of the lithographic apparatus including at least the source and the projection optics.

Figure 2A:
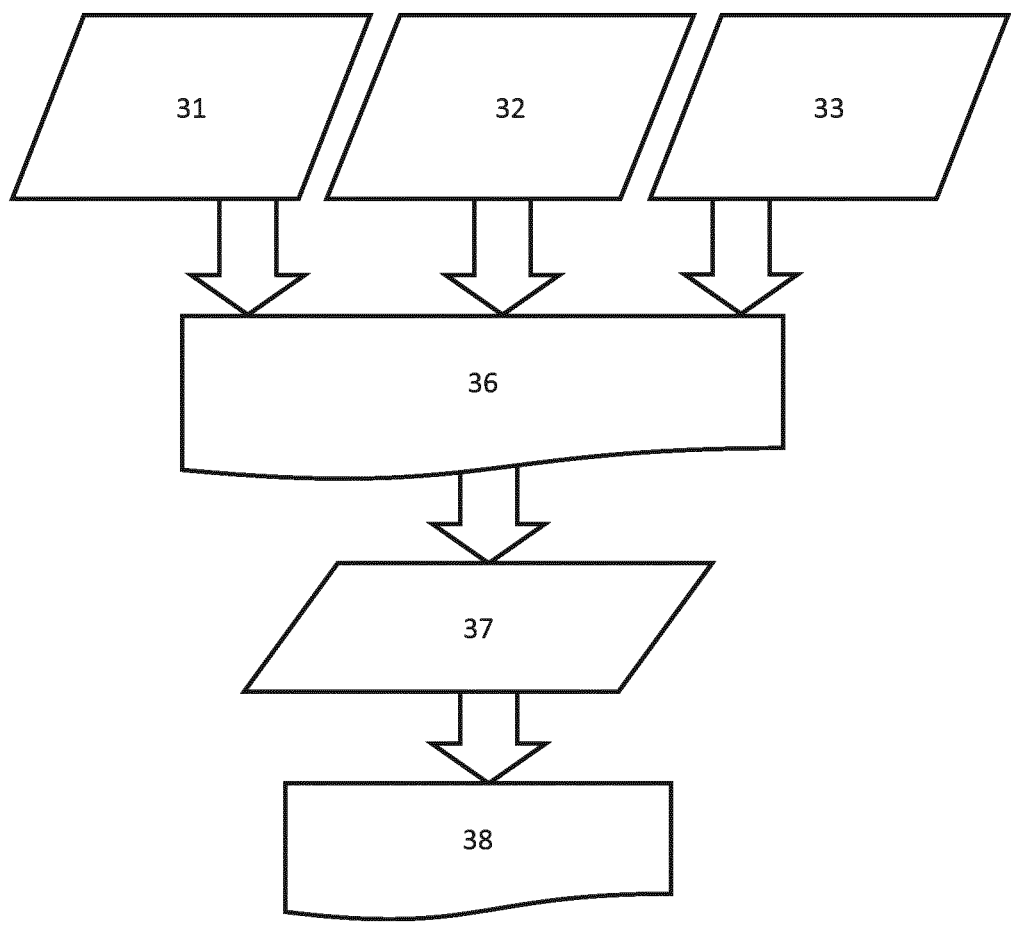
FIG. 2A shows a flow chart for simulating lithography in a lithographic apparatus.

A flow chart for simulating lithography in a lithographic apparatus is illustrated in FIG. 2A. A source model 31 represents optical characteristics (including radiation intensity distribution and/or phase distribution) of the source. A projection optics model 32 represents optical characteristics (including changes to the radiation intensity distribution and/or the phase distribution caused by the projection optics) of the projection optics. The projection optics model 32 may include aberration caused by various factors, for example, heating of the components of the projection optics, stress caused by mechanical connections of the components of the projection optics. The source model 31 and the projection optics model 32 can be combined into a transmission cross coefficient (TCC) model. A design layout model 33 represents optical characteristics (including changes to the radiation intensity distribution and/or the phase distribution caused by a given design layout) of a design layout, which is the representation of an arrangement of features of a patterning device. An aerial image 36 can be simulated from the source model 31, the projection optics model 32 and the design layout model 33. A resist image 38 can be simulated from the aerial image 36 using a resist model 37. Simulation of lithography can, for example, predict contours and CDs in the resist image.

More specifically, it is noted that the source model 31 can represent the optical characteristics of the source that include, but not limited to, NA-sigma ($\sigma$) settings as well as any particular illumination source shape (e.g. off-axis radiation sources such as annular, quadrupole, and dipole, etc.). The projection optics model 32 can represent the optical characteristics of the of the projection optics that include aberration, distortion, refractive indexes, physical sizes, physical dimensions, absorption, etc. The design layout model 33 can also represent physical properties of a physical patterning device, as described, for example, in U.S. Pat. No. 7,587,704, which is incorporated by reference in its entirety. The objective of the simulation is to accurately predict, for example, edge placements and CDs, which can then be compared against an intended design. The intended design is generally defined as a pre-OPC design layout which can be provided in a standardized digital file format such as GDSII or OASIS or other file format.

From this design layout, one or more portions may be identified, which are referred to as "clips." In a specific embodiment, a set of clips is extracted, which represents the complicated patterns in the design layout (typically about 50 to 1000 clips, although any number of clips may be used). As will be appreciated by those skilled in the art, these patterns or clips represent small portions (i.e. circuits, cells or patterns) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips usually contain one or more test patterns or gauge patterns.

An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

Figure 2B:
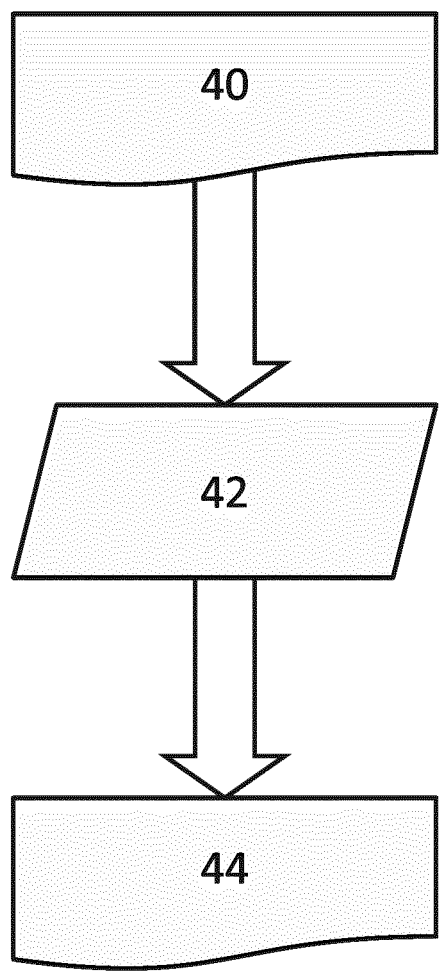
FIG. 2B shows a generic flow of simulating an optical system (e.g., the patterning device, the mask, etc.)

Simulation of a lithographic process is certainly not limited to the flow illustrated in FIG. 2A. The lithographic apparatus (including the illumination optics, the patterning device, the projection optics and possibly the substrate) used in the lithographic process is an example of an optical system. An optical system transforms an image upstream along an optical path to an image downstream. Using the illumination source in FIG. 1B as an example, the illumination optics transforms an image of the plasma to an image on the illumination pupil. Using the lithographic apparatus in FIG. 1A as an example, the patterning device 18 and transmission optics 16c collectively transform an image on the illumination pupil to an image on the substrate plane. The substrate itself can be considered an optical system, too, which transforms an image at the top surface of any resist layer on the substrate to an image inside the resist layer (e.g., on a plane at a certain depth in the resist layer). FIG. 2B shows a generic flow of simulating an optical system (e.g., the patterning device, the mask, etc.). A downstream image may be simulated from a given upstream image 40 and a model 42 of the optical system. The key in this flow is the model 42, which ideally captures the optical behavior of the optical system. Sometimes, an ideal optical model may be very difficult to construct or computationally very expensive. An approximate model may be more practical.

Simulation can be useful in optimizing the lithographic apparatus or process. In an optimization process of a system or process, a figure of merit of the system can be represented as a cost function. The optimization process boils down to a process of finding a set of parameters (design variables) of the system that minimizes the cost function. The cost function can have any suitable form depending on the goal of the optimization. For example, the cost function can be weighted root mean square (RMS) of deviations of certain characteristics (evaluation points) of the system or process with respect to the intended values (e.g., ideal values) of these characteristics; the cost function can also be the maximum of these deviations. The term "evaluation points" herein should be interpreted broadly to include any characteristics of the system or process. The design variables of the system or process can be confined to finite ranges and/or be interdependent due to practicalities of implementations of the system. In case of a lithographic apparatus or process, the constraints are often associated with physical properties and characteristics of the hardware such as tunable ranges, and/or patterning device manufacturability design rules, and the evaluation points can include physical points on a resist image on a substrate, as well as non-physical characteristics such as dose and focus. As used herein, an image means spatial intensity distribution (including a blurred intensity distribution), spatial phase distribution, or both, of radiation, on a surface. The surface can be a plane perpendicular to the optical axis of an optical system.

Examples of optimization methods can be found, for example, in U.S. patent application Ser. No. 12/914,946 filed Oct. 28, 2010, the disclosure of which is hereby incorporated by reference in its entirety.

Models used in simulation should take into account physical effects that impact the lithographic process. One such effect is the finite heights of the features on a patterning device. The finite heights (non-negligible) of the features on a patterning device may contribute to pattern displacement errors (PDE), also known as pattern shift errors. The PDE is a measurement of the shift of a pattern from its intended location in a simulated or actual image (e.g., aerial image, resist image, and etched image). The finite heights and spatial distribution of the features on a patterning device can also change images downstream from the patterning device by scattering incident radiation off the edges, surface, and corners of these features. The term "scatter" or "scattering" as used herein means a combination of effects to incident radiation, which can include reflection, diffraction, and refraction.

Figure 3A:
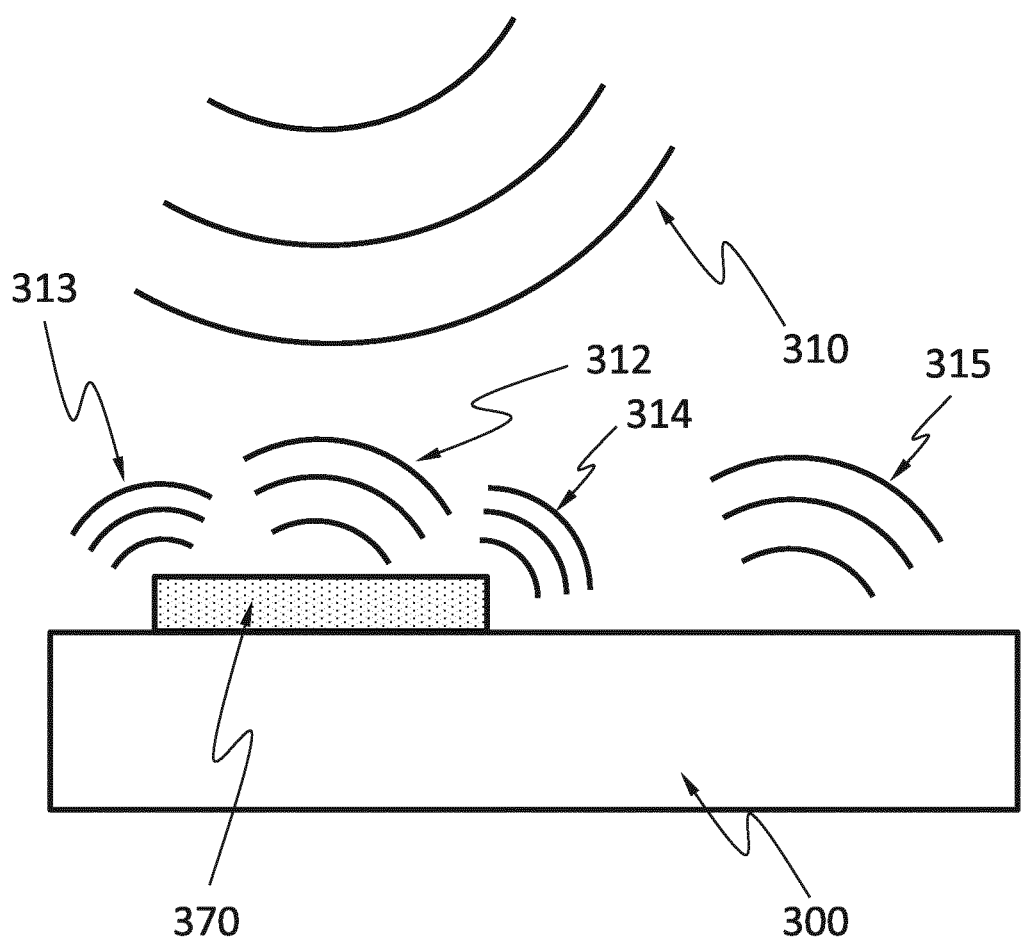
FIG. 3A schematically shows scattering of a feature with a finite height on a reflective patterning device.

FIG. 3A schematically shows scattering of a feature 370 with a finite height on a reflective patterning device 300. The feature 370 may be an absorbing material that absorbs the incident radiation 310 from the source. The angle of incidence may be non-zero. The angle of incidence at a location on the patterning device may be different for radiation from different parts of the illumination pupil. The angle of incidence at different locations for radiation from the same part of the illumination pupil may be different. A reflective patterning device may be found in a lithographic apparatus using EUV radiation. The feature 370 may scatter the incident radiation 310 from its various portions such as its face, edges and corners. The scattered radiation from these portions (e.g., scattered radiation 312, if any, from the face of the feature 370, scattered radiation 313 from the leading edge of the feature 370, scattered radiation 314 from the trailing edge of the feature 370, and scattered radiation (not shown) from the side edges, and the corners of the feature 370, etc.) and scattered radiation 315 from an area of the patterning device without any absorbing material may have different characteristics such as different direction, intensity, phase. An image downstream of the patterning device 300 (e.g., at a plane below the patterning device, at the entrance pupil of the projection optics) is affected by these scattered radiations.

Figure 3B:
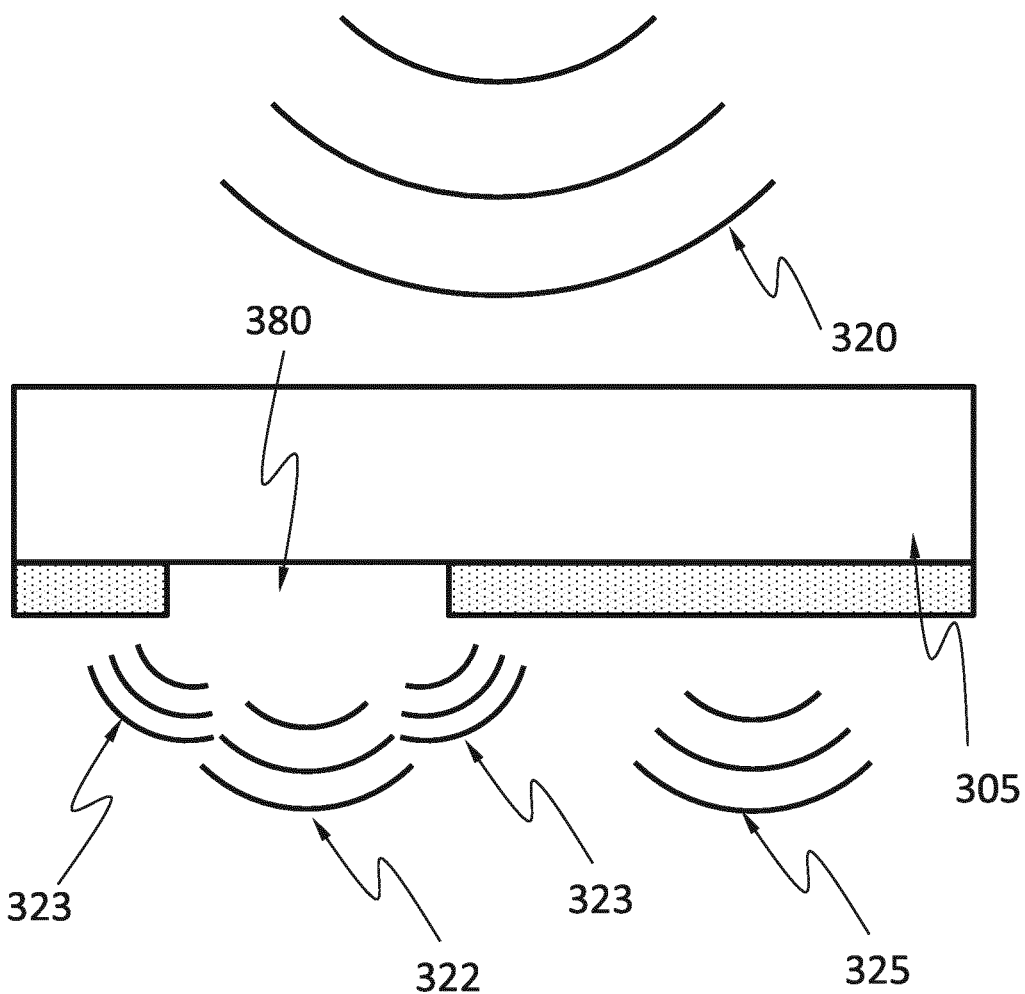
FIG. 3B schematically shows scattering of a feature with a finite height on a transmissive patterning device.

FIG. 3B schematically shows scattering of a feature 380 with a finite height on a transmissive patterning device 305. The feature 380 may be an opening in a layer of absorbing material that absorbs the incident radiation 320 from the source. The angle of incidence may be but not necessarily zero. The incident radiation 320 may have multiple angles of incidence. Namely, the incident radiation 320 may come from multiple directions. A transmissive patterning device may be found in a lithographic apparatus using DUV radiation. The feature 380 may scatter the incident radiation 320 from its various portions such as its face, edges and corners. The scattered radiation from these portions (e.g., scattered radiation 322 from the face of the feature 380, scattered radiation 323 from the edges of the feature 380, and scattered radiation (not shown) from the corners of the feature 380, etc.) and scattered radiation 325, if any, from an area of the patterning device covered by the layer of absorbing material may have different characteristics such as different direction, intensity, phase. An image downstream of the patterning device 305 (e.g., at a plane below the patterning device, at the entrance pupil of the projection optics) is affected by these scattered radiations.

Figure 3C:
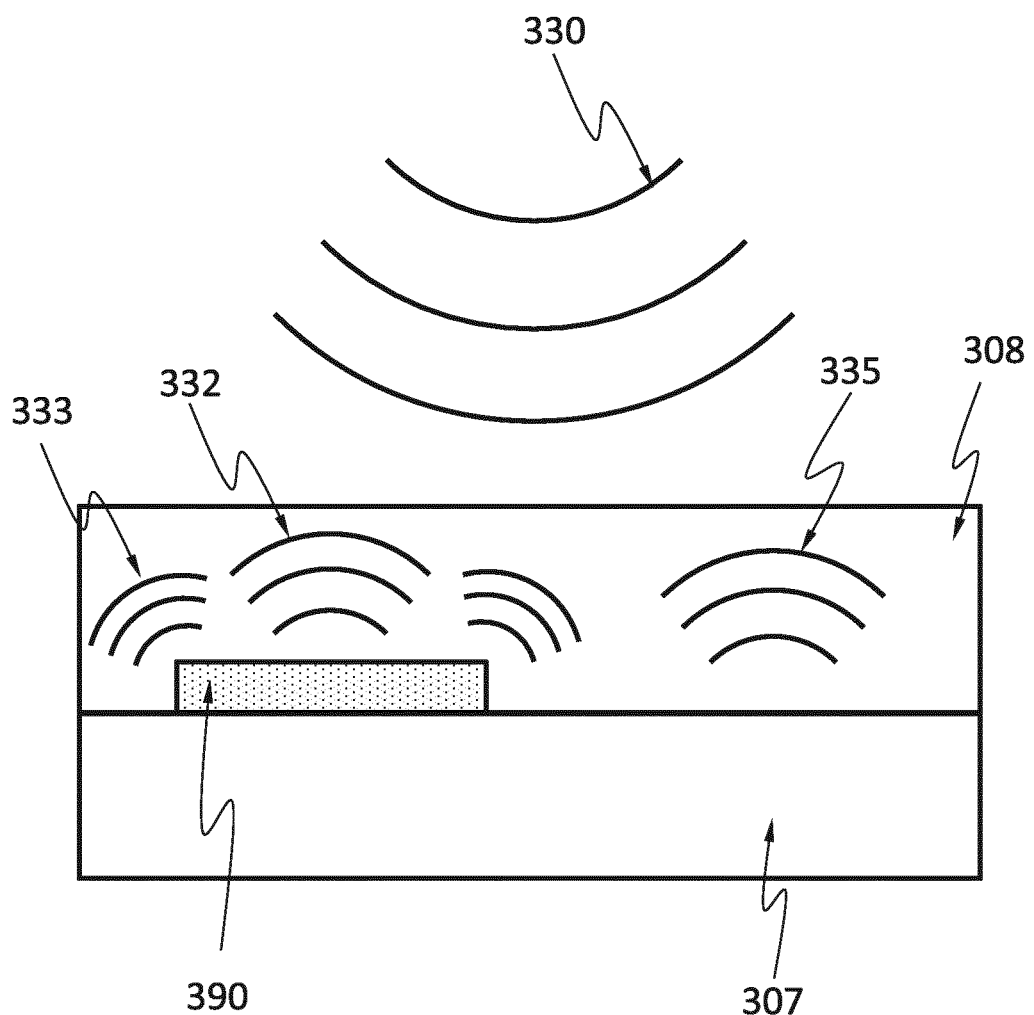
FIG. 3C schematically shows scattering of a structure with a finite height on a substrate.

Another such effect is the finite (non-negligible) heights and spatial distribution of structures on a substrate. The edges, surface, and corners of these structures can also scatter radiation and thus change a resist image in a resist layer on the substrate. FIG. 3C schematically shows scattering of a structure 390 with a finite height on a substrate 307. The structure 390 may be a bump or a recess on the substrate 307 and may be underneath a resist layer 308. The structure 390 may comprise a metal, a dielectric or other materials. The structure 390 may be transparent or opaque to incident radiation 330. The angle of incidence may be but not necessarily zero. The incident radiation 330 may have multiple angles of incidence. Namely, the incident radiation 330 may come from multiple directions. Structure 390 may scatter the incident radiation 330 from its various portions such as its face, edges and corners. The scattered radiation from these portions (e.g., scattered radiation 332 from the face of the structure 390, scattered radiation 333 from the edges of the structure 390, and scattered radiation (not shown) from the corners of the structure 390, etc.) and scattered radiation 355, if any, from an area of the substrate without any structure (i.e., bare substrate with only the resist layer 308 thereon) may have different characteristics such as different direction, intensity, phase. An image in the resist layer 308 (e.g., at a plane in the resist layer 308) is affected by these scattered radiations. For example, the scattered radiations may interfere with the incident radiation 330 and as a result change spatial distribution of radiation intensity in the resist layer 308.

These effects can be rigorously modeled using Maxwell's equations, which however is computationally costly and impractical to apply to a full substrate or a full patterning device.

Figure 4:
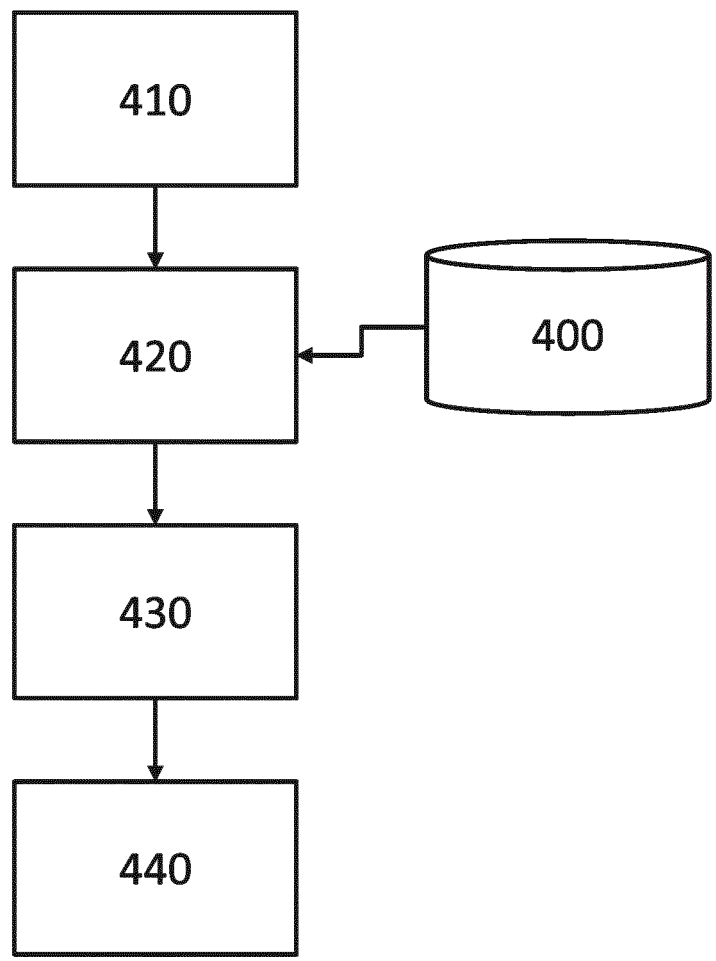
FIG. 4 shows a flow chart of a method according to an embodiment that allows less computationally costly modeling of an image in a resist layer on a substrate or an image downstream of a patterning device, with at least the effect of the finite heights and spatial distribution of structures on the substrate or of the finite heights and spatial distribution of the features on a patterning device taken into account.

FIG. 4 shows a flow chart of a method according to an embodiment that allows less computationally costly modeling of an image in a resist layer on a substrate or an image downstream of a patterning device, with at least the effect of the finite heights and spatial distribution of structures on the substrate or of the finite heights and spatial distribution of the features on a patterning device taken into account. In step 410, regions of uniform optical properties (e.g., regions within each of which the stack of structures or features is substantially uniform in directions parallel to the substrate or the patterning device) are identified from a portion or the entirety of the substrate or patterning device. Here, the stack of structures or features is still considered substantially uniform even if any features or structures that do not substantially contribute to the optical properties of the stack (e.g., layers below a planarization layer, layers below a reflective layer, etc.) are not uniform. For example, in the context of a patterning device, a region of uniform optical properties may be a region across which the optical properties as dictated by absorbance (also called optical density), refractive index, thickness, etc. are uniform; in the context of a substrate, a region of uniform optical properties may be a region across which the optical properties as dictated by compositions, order, thickness, reflection of structures in or under the resist, etc. are uniform. In step 420, for every region of uniform optical properties, an image is obtained (e.g., retrieved from an image database 400), where the obtained image is one that would be formed from the substrate or patterning device if the entirety of the substrate or patterning device has the same uniform optical properties as that region. For example, for a region of uniform optical properties on a substrate, which has a stack of structures includes (in the order from the substrate to the resist thereon) a gold layer of 100 nm, a silicon nitride layer of 500 nm and a PMMA resist layer of 1000 nm, the obtained image would be an image that would have been formed by a substrate having the exactly same stack of structures (a gold layer of 100 nm, a silicon nitride layer of 500 nm and a PMMA resist layer of 1000 nm) across the entirety of the substrate. The obtained images may be on a same image plane for the convenience of stitching. If the images are not on the same image plane, they may nevertheless be stitched. The images being on the same image plane does not mean that the resist layer is necessarily planar. The obtained images may be images obtained under the same conditions apart from the patterning device or substrate (e.g., conditions of the projection optics, the source). In step 430, a stitched image is formed by stitching the obtained images for the regions of uniform optical properties according to the location of the regions in the portion or the entirety of the substrate or patterning device. In step 440, the image in the resist layer on the substrate or the image downstream of the patterning device is formed by applying adjustment to the stitched images, where the adjustment at least partially corrects for or at least partially imitates an effect of finite sizes of the regions (e.g., scattering from corners, edges, interfaces and other portions of the regions). For example, a $1^{st}$-order adjustment may be in the form of smooth transitions between the stitched images.

FIGS. 5-10 show schematics to illustrate the method of FIG. 4.

Figure 5:
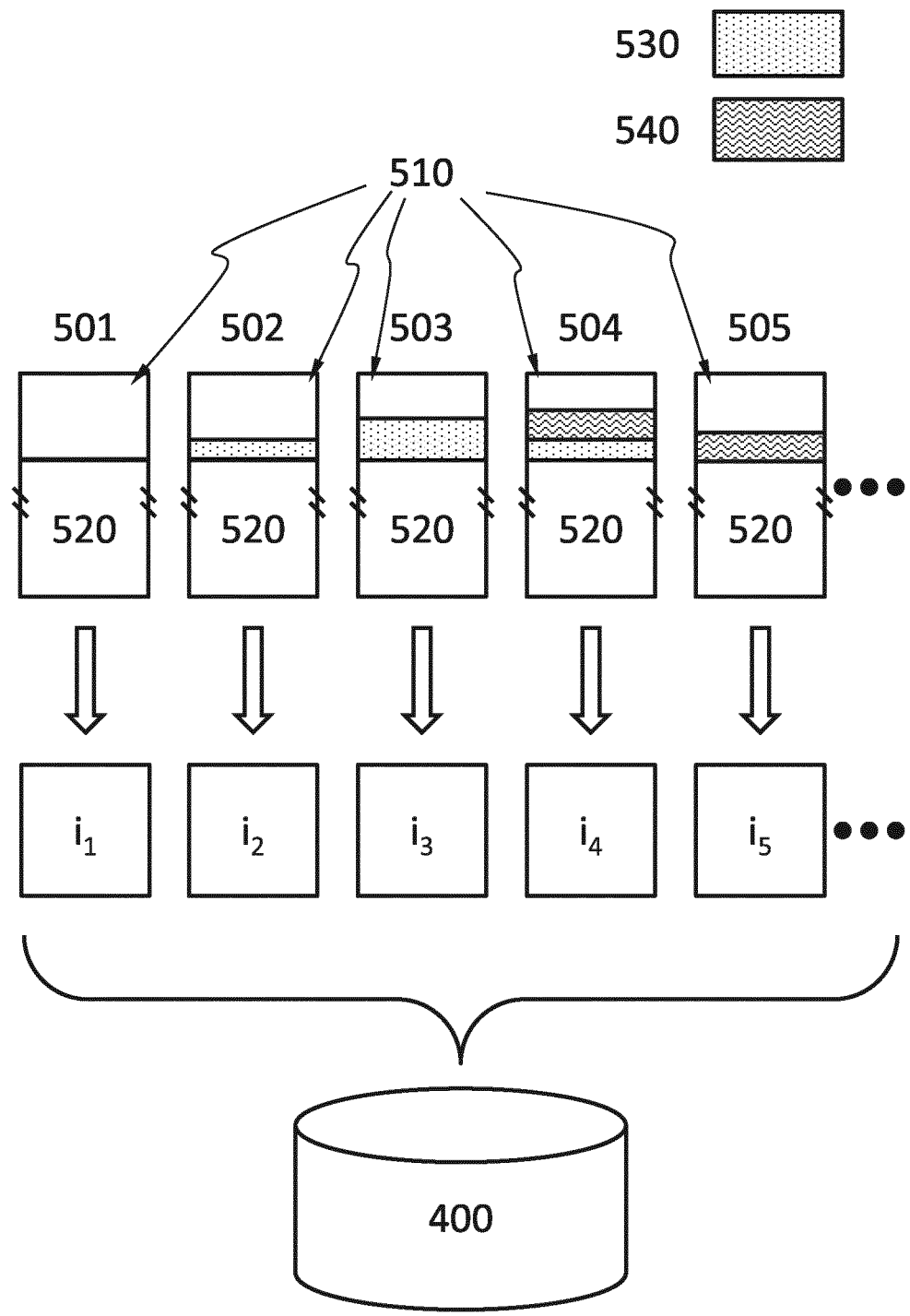
FIG. 5 shows five examples of uniform optical properties on a substrate.

FIG. 5 shows five examples of regions of uniform optical properties 501-505 on a substrate 520. Region 501 consists of a layer of resist 510 on the substrate 520. There are no other structures in region 501. Region 502 consists of a layer of resist 510, and a layer of material 530 on the substrate 520 below the layer of resist 510. Region 503 also consists of a layer of resist 510, and a layer of material 530 on the substrate 520 below the layer of resist 510 but the layer of material 530 in region 503 is thicker than the layer of material 530 in region 502. Region 504 consists of a layer of material 530 on the substrate 520, a layer of material 540 directly on the layer of material 530, and a layer of resist 510, directly on the layer of material 540. Region 505 consists of a layer of resist 510, and a layer of material 540 on the substrate 520 below the layer of resist 510. The images in the resist layer 510 formed by a substrate 520 with regions 501-505 across the entirety of the substrate 520, under a given condition, are images $i_1$-$i_5$, respectively. These images $i_1$-$i_5$ may be vigorously calculated and compiled in the database 400 for future use. The database may store images of a variety of uniform optical properties formed under a variety of conditions.

Figure 6:
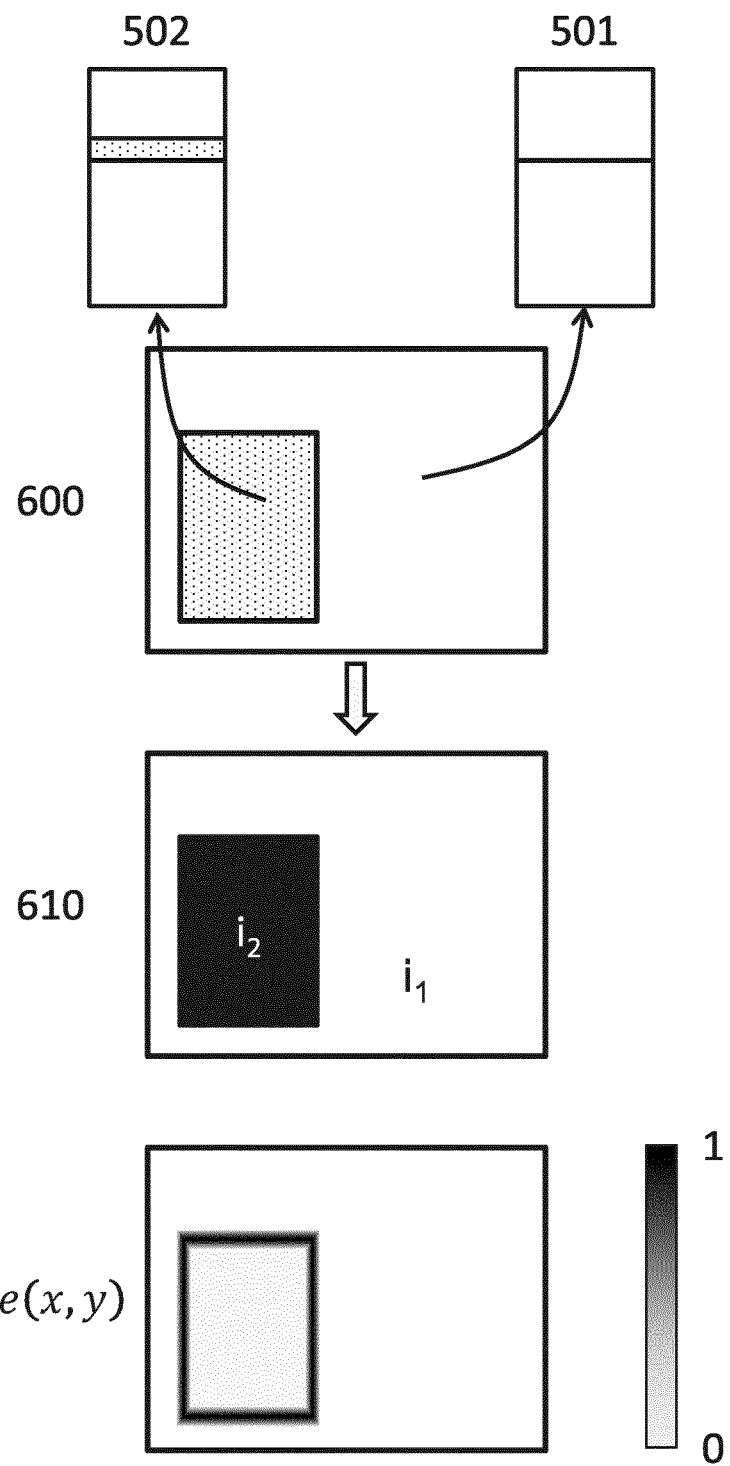
FIG. 6 shows a portion of a substrate, where the portion may be divided into two regions of uniform optical properties.

FIG. 6 shows a portion 600 of a substrate. The portion 600 may be divided into two regions of uniform optical properties 501 and 502. Images $i_1$ and $i_2$ are obtained for these two regions of uniform optical properties 501 and 502, respectively. The images $i_1$ and $i_2$ may be retrieved from a database such as the database 400, or rigorously calculated. The images $i_1$ and $i_2$ are then stitched according to location of the two regions of uniform optical properties 501 and 502 to form a stitched image 610.

Figure 7A:
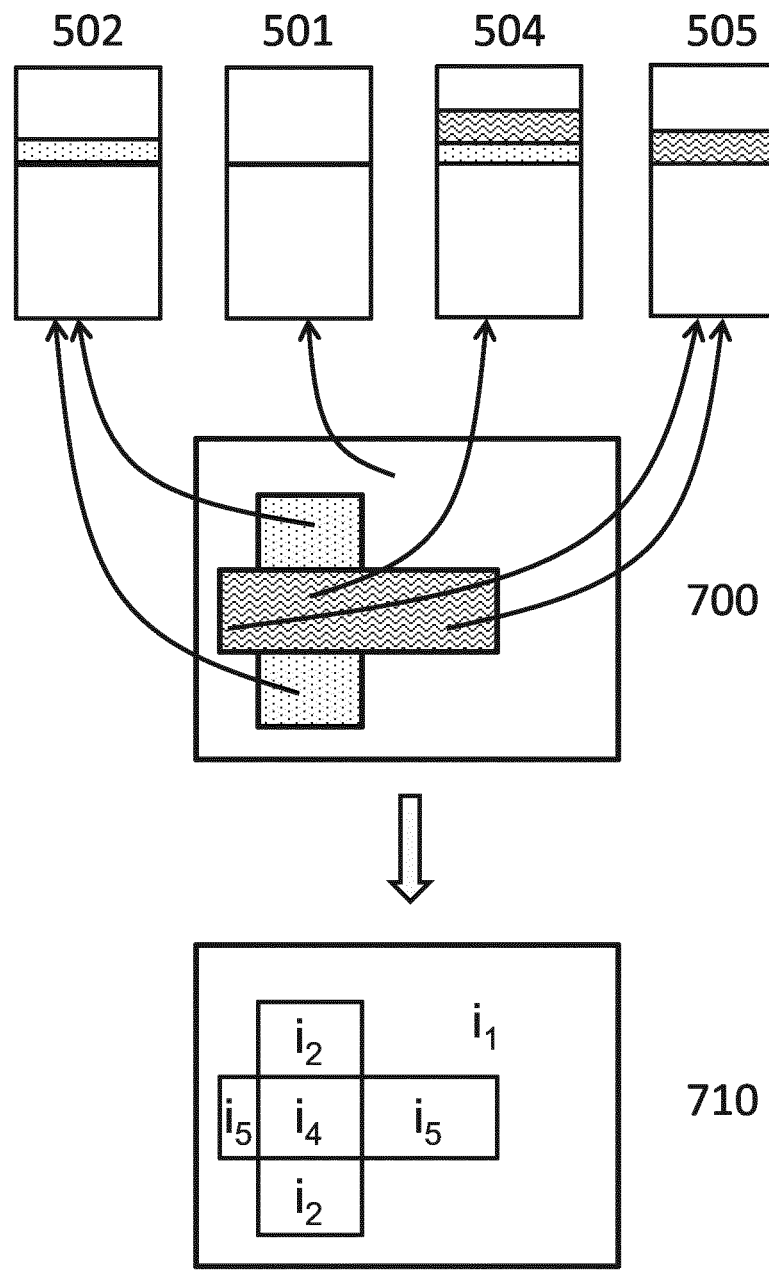
FIG. 7A shows a portion of a substrate, where the portion may be divided into six regions of uniform optical properties.

FIG. 7A shows a portion 700 of a substrate. The portion 700 may be divided into six regions of uniform optical properties 501, 502, 504 and 505 (two regions 502 of the six regions are not adjacent to each other but both have identical optical properties; another two regions 505 of the six regions are not adjacent to each other but both have identical optical properties). Images $i_1$, $i_2$, $i_4$, and $i_5$ are obtained for these six regions of uniform optical properties 501, 502, 504 and 505, respectively. The images $i_1$, $i_2$, $i_4$, and $i_5$ may be retrieved from a database such as the database 400, or rigorously calculated. The images $i_1$, $i_2$, $i_4$, and $i_5$ are then stitched according to location of the six regions of uniform optical properties 501, 502, 504 and 505 to form a stitched image 710.

Figure 7B:
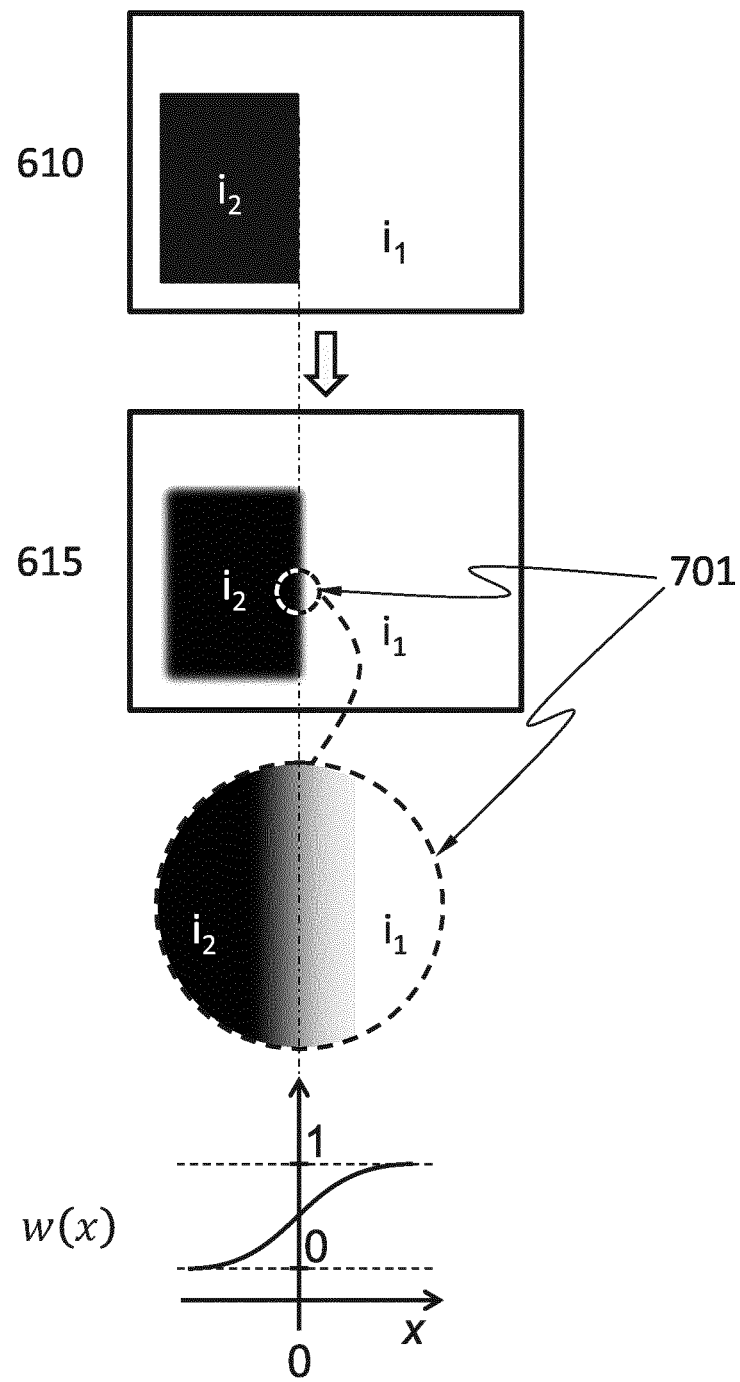
FIG. 7B shows one adjustment to a stitched image so as to form an image in the resist layer.

FIG. 7B shows one adjustment to the stitched image 610 so as to form an image 615 in the resist layer. In this example, a $1^{st}$-order adjustment causes a smooth transition at boundaries of the images (e.g., $i_1$, $i_2$, $i_4$, and $i_5$) in the stitched image. Physics dictates that the actual image should not have abrupt changes at a boundary. The $1^{st}$-order adjustment is shown in the dotted circle 701 at the boundary between images $i_1$ and $i_2$. Image $i_2$ is depicted as black and image $i_1$ is depicted as white in order to schematically show the smooth transition therebetween by a grayscale transition from black to white. In an example, at this boundary between images $i_1$ and $i_2$, the image in the resist layer can be expressed as $i_2 \cdot w(-x) + i_1 \cdot w(x)$, where x is a direction perpendicular to the boundary; x=0 at the boundary; x is positive to the right of the boundary and negative to the left of the boundary; w(x) is a smooth function that satisfies $\lim_{x \to -\infty} w(x) = 0$ and $\lim_{x \to \infty} w(x) = 1$. In an example, $$w(x) = 1 + \frac{1}{2}\text{erf}(x) = 1 + \frac{1}{\sqrt{\pi}} \int_0^x e^{-t^2} dt,$$

where erf(x) is the Gauss error function.

Figure 8:
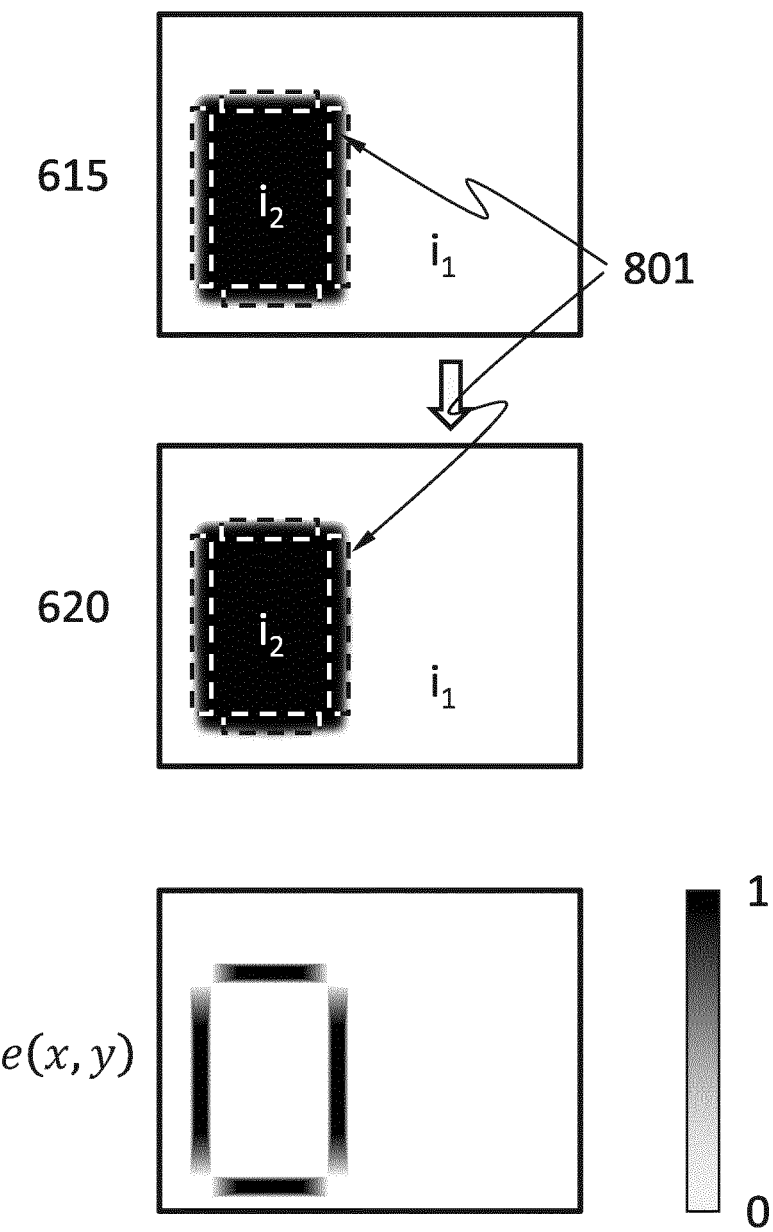
FIG. 8 shows another adjustment to a stitched image so as to form an image in the resist layer.

FIG. 8 shows an adjustment to the image 615 so as to form an image 620 in the resist layer. In this example, a $2^{nd}$-order adjustment is applied that reflects scattering from the edges of region 502 (for example in the dotted boxes 801). This adjustment may be written as $e(\vec{r}) \otimes s(\vec{r})$ where $e(\vec{r})$ represents locations of the edges of the regions of uniform optical properties by having non-zero values near these edges and zero elsewhere as schematically shown; $s(\vec{r})$ is a kernel function that represents any physical effects (e.g., scattering) at these edges.

Figure 9:
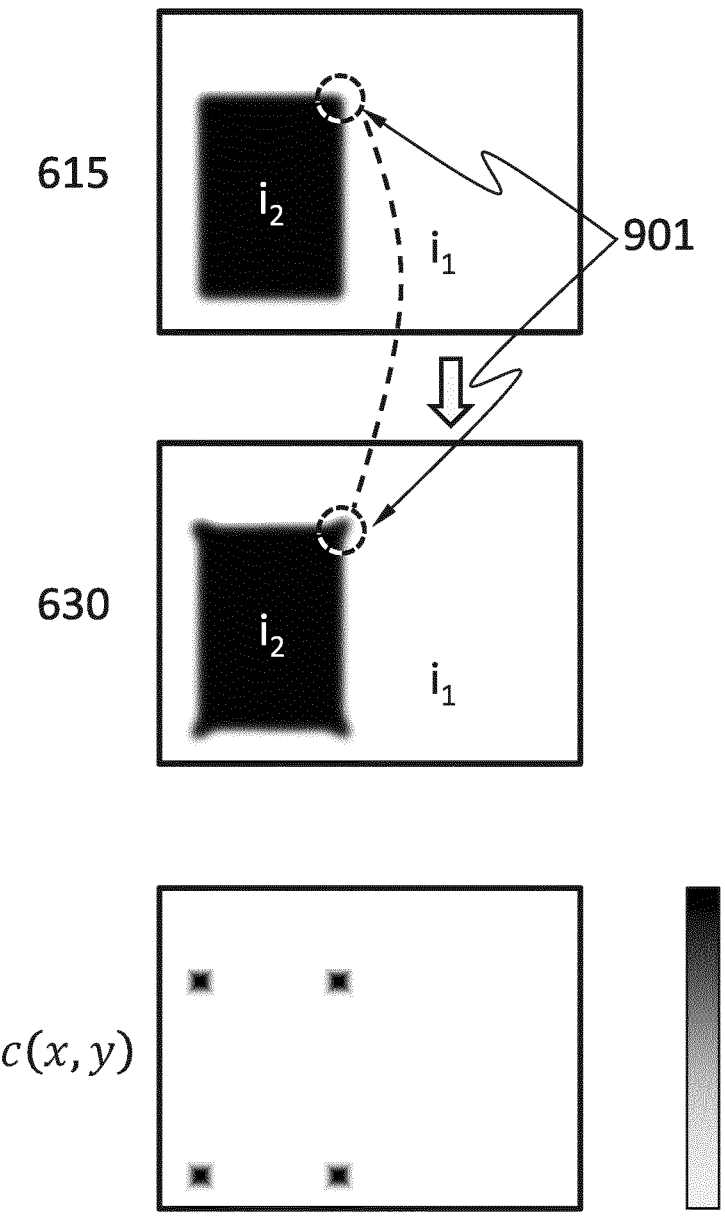
FIG. 9 shows another adjustment to a stitched image so as to form an image in the resist layer.

FIG. 9 shows another adjustment to the stitched image 615 so as to form an image 630 in the resist layer. In this example, a $2^{nd}$-order adjustment is applied that reflects scattering from the four corners of the region 502 (for example in the dotted circle 901). This adjustment may be written as $c(\vec{r}) \otimes u(\vec{r})$ where $c(\vec{r})$ represents locations of the corners of the regions of uniform optical properties by having non-zero values near these corners and zero elsewhere as schematically shown; $u(\vec{r})$ is a kernel function that represents any physical effects (e.g., scattering) at these corners.

Figure 10:
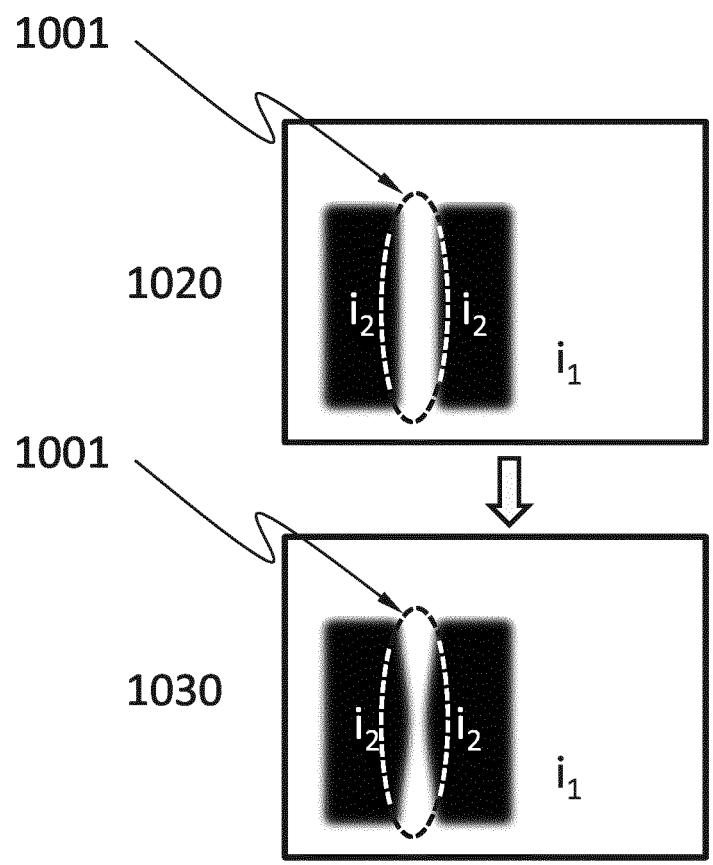
FIG. 10 shows another adjustment to a stitched image so as to form an image in the resist layer.
Figure 10:
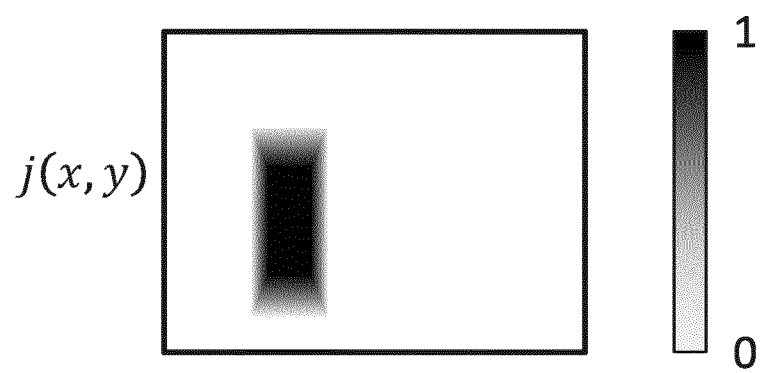

FIG. 10 shows yet another adjustment to a stitched image 1020 for a substrate with two regions 502 and the rest of the substrate is a region 501. In this example, a $2^{nd}$-order adjustment is applied that reflects scattering from two adjacent edges of the regions 502 (in the dotted circle 1001). This adjustment may be written as $j(\vec{r}) \otimes v(\vec{r})$ where $j(\vec{r})$ represents locations of adjacent edges of the regions of uniform optical properties by having non-zero values near these adjacent edges and zero elsewhere as schematically shown; $v(\vec{r})$ is a kernel function that represents any physical effects (e.g., scattering) at these adjacent edges.

Adjustments to the stitched image may be mathematically expressed in a generic form: $\Sigma G(\vec{r}) \otimes f(\vec{r})$, where $G(\vec{r})$ is a function that represents locations of certain characteristics (geometrical characteristics such as edge, corner, adjacent edges, etc.) of the regions of uniform optical properties, by having have non-zero values near these certain features and zero value elsewhere. $f(\vec{r})$ is a kernel function that represents any physical effects (e.g., scattering) of these certain characteristics. The kernel functions for various features may be rigorously calculated and compiled in a database. The kernel functions may depend on conditions unrelated to the substrate or the patterning device.

Figure 11:
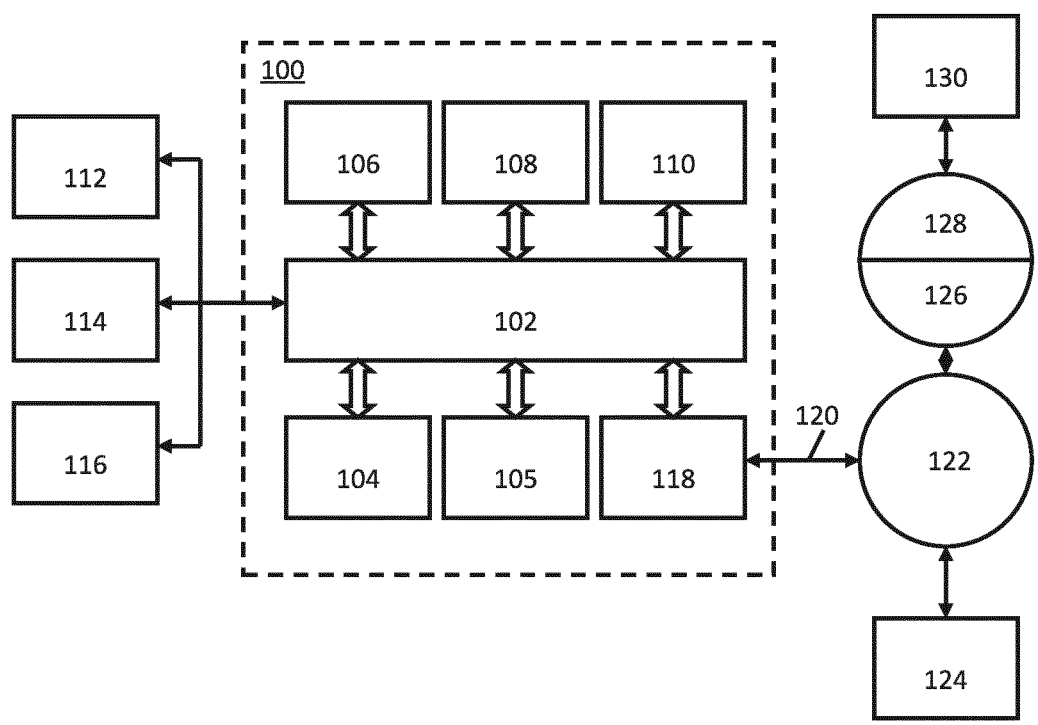
FIG. 11 is a block diagram of an example computer system in which embodiments can be implemented.

FIG. 11 is a block diagram that illustrates a computer system 100 which can assist in implementing the optimization methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the optimization process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with one or more embodiments, one such downloaded application provides for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 12:
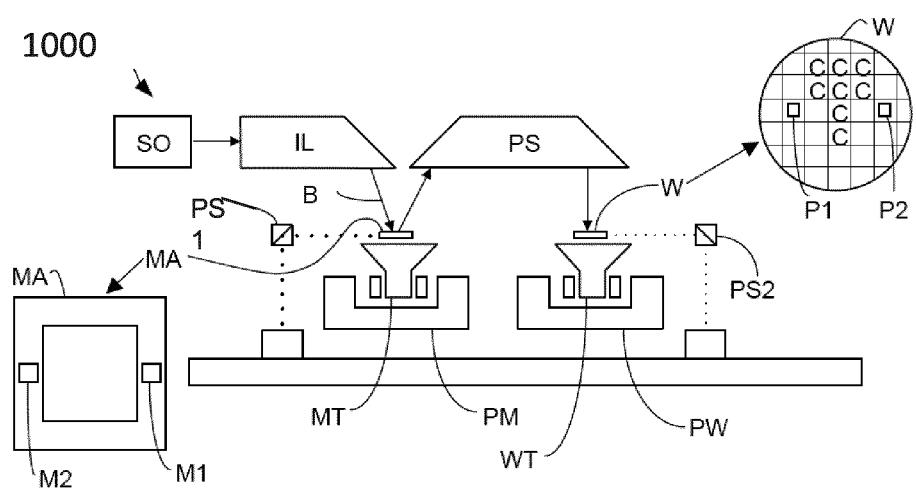
FIG. 12 is a schematic diagram of another lithographic apparatus.

FIG. 12 schematically depicts another lithographic apparatus 1000 whose illumination source could be optimized utilizing the methods described herein.

The lithographic apparatus 1000 includes:

a source collector module SO an illumination system (illuminator) IL configured to condition a radiation beam B (e.g. EUV radiation).

a support structure (e.g. a mask table) MT constructed to support a patterning device (e.g. a mask or a reticle) MA and connected to a first positioner PM configured to accurately position the patterning device;

a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective mask). It is to be noted that because most materials are absorptive within the EUV wavelength range, the mask may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 12, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 12, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-) magnification and image reversal characteristics of the projection system PS.

3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 13:
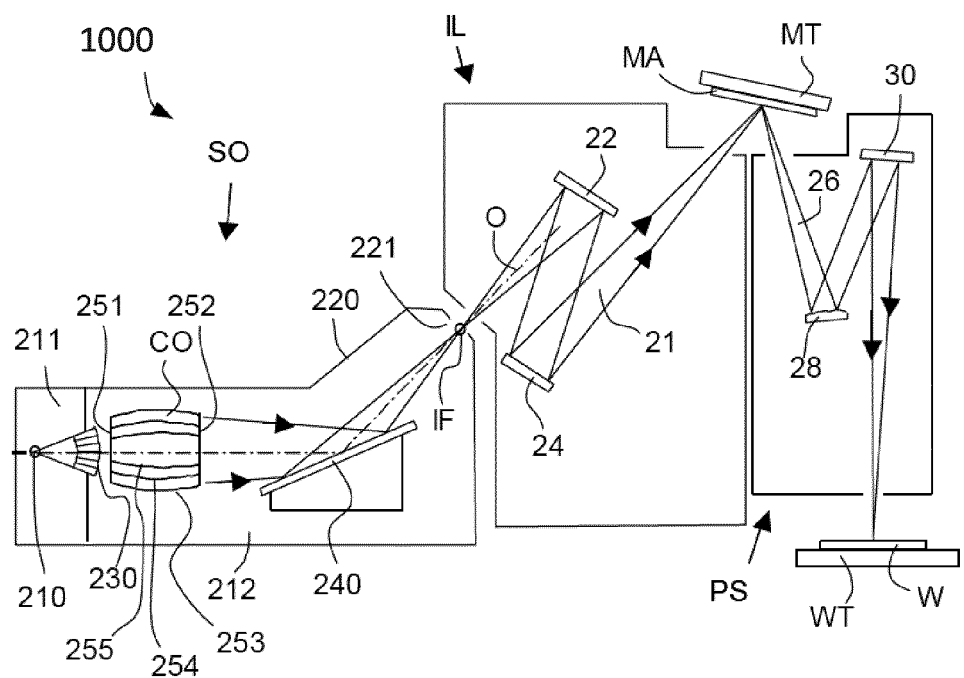
FIG. 13 is a more detailed view of the apparatus in FIG. 12.

FIG. 13 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing an at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 13.

Collector optic CO, as illustrated in FIG. 13, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type is preferably used in combination with a discharge produced plasma source, often called a DPP source.

Figure 14:
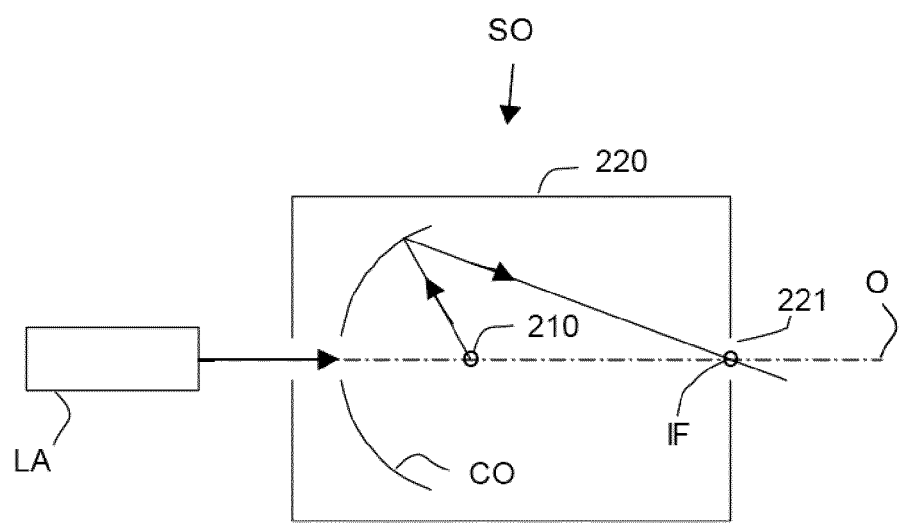
FIG. 14 is a more detailed view of the source collector module SO of the apparatus of FIG. 12 and FIG. 13.

Alternatively, the source collector module SO may be part of an LPP radiation system as shown in FIG. 14. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The invention may further be described using the following clauses:

1. A computer-implemented method of image simulation for a device manufacturing process, the method comprising:
   identifying regions of uniform optical properties from a portion or an entirety of a substrate, wherein optical properties are uniform within each of the regions;
   obtaining an image for each of the regions, wherein the image is one that would be formed from the substrate if the entirety of the substrate has the same uniform optical properties as that region;
   forming a stitched image by stitching the image for each of the regions according to locations of the regions in the portion or the entirety of the substrate;
   forming, by a computer, an adjusted image by applying adjustment to the stitched image for at least partially correcting for or at least partially imitating an effect of finite sizes of the regions.
2. The method of clause 1, wherein at least some of the regions comprise structures having a finite height.
3. The method of any one of clauses 1 to 2, wherein the adjusted image is an image in a resist layer on the substrate.
4. The method of any one of clauses 1 to 3, wherein a stack of structures within each of the regions is substantially uniform.
5. The method of any one of clauses 1 to 4, wherein the optical properties are dictated by parameters selected from a group consisting of absorbance, refractive index, thickness, compositions, order, reflection of structures in or under a resist layer, and a combination thereof.
6. The method of any one of clauses 1 to 5, wherein obtaining the image for each of the regions comprises retrieving the image from a database.
7. The method of any one of clauses 1 to 6, wherein the image for each of the regions is on a same image plane.
8. The method of any one of clauses 1 to 7, wherein the image for each of the regions is obtained under same conditions apart from the substrate.
9. The method of clause 4, wherein the adjustment reflects an effect of finite height of the structures.
10. The method of any one of clauses 1 to 9, wherein the adjustment comprises a smooth transition at boundaries between the images for the regions or an effect of scattering from edges of the regions.
11. The method of any one of clauses 1 to 10, wherein the adjustment reflects an effect of scattering from corners of the regions.
12. The method of any one of clauses 1 to 11, wherein the adjustment reflects an effect of scattering from two adjacent edges of the regions.
13. The method of any one of clauses 1 to 12, applying the adjustment comprises a convolution of a location function that represents locations of characteristics of the regions and a kernel function that represents physical effects of the characteristics.
14. The method of clause 13, wherein applying the adjustment comprises retrieving the kernel function from a database.
15. The method of clause 13, wherein applying the adjustment comprises calculating the location function from the substrate.
16. The method of clause 4, wherein the structures are under a resist layer on the substrate.
17. A computer-implemented method of image simulation for a device manufacturing process, the method comprising:
   identifying regions of uniform optical properties from a portion or an entirety of a patterning device, wherein optical properties are uniform within each of the regions;
   obtaining an image for each of the regions, wherein the image is one that would be formed from the patterning device if the entirety of the patterning device has the same uniform optical properties as that region;
   forming a stitched image by stitching the image for each of the regions according to locations of the regions in the portion or the entirety of the patterning device;
   forming an adjusted image by applying adjustment to the stitched image for imitating an effect of finite sizes of the regions.
18. The method of clause 17, wherein at least some of the regions comprise features having a finite height.
19. The method of any one of clauses 17 to 18, wherein the adjusted image is an image downstream of the patterning device.
20. The method of any one of clauses 17 to 19, wherein a stack of features within each of the regions is uniform.
21. The method of any one of clauses 17 to 20, wherein the optical properties are dictated by parameters selected from a group consisting of absorbance, refractive index, thickness, compositions, order, and a combination thereof.
22. The method of any one of clauses 17 to 21, wherein obtaining the image for each of the regions comprises retrieving the image from a database.
23. The method of any one of clauses 17 to 22, wherein the image for each of the regions is on a same image plane.
24. The method of any one of clauses 17 to 23, wherein the image for each of the regions is obtained under same conditions apart from the patterning device.
25. The method of clause 20, wherein the adjustment reflects an effect of finite height of the features.
26. The method of any one of clauses 17 to 25, wherein the adjustment comprises a smooth transition at boundaries between the images for the regions.
27. The method of any one of clauses 17 to 26, wherein the adjustment reflects an effect of scattering from corners of the regions.
28. The method of any one of clauses 17 to 27, wherein the adjustment reflects an effect of scattering from two adjacent edges of the regions.
29. The method of any one of clauses 17 to 28, applying the adjustment comprises a convolution of a location function that represents locations of characteristics of the regions and a kernel function that represents physical effects of the characteristics.
30. The method of clause 29, wherein applying the adjustment comprises retrieving the kernel function from a database.

31. The method of clause 29, wherein applying the adjustment comprises calculating the location function from the patterning device.
32. The method of any one of clauses 1 to 31, the device manufacturing process is a lithography process using extreme ultraviolet light to expose a design layout on the patterning device to the substrate.
33. A computer program product comprising a computer readable medium having instructions recorded thereon, the instructions when executed by a computer implementing the method of any of the above clauses.
34. A computer program product comprising a computer readable medium, having a database of images of regions of uniform optical properties recorded thereon.
35. A computer program product comprising a computer readable medium, having a database of kernel functions that represent physical effects of characteristics of regions of uniform optical properties.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Aspects of the invention can be implemented in any convenient form. For example, an embodiment may be implemented by one or more appropriate computer programs which may be carried on an appropriate carrier medium which may be a tangible carrier medium (e.g. a disk) or an intangible carrier medium (e.g. a communications signal). Embodiments of the invention may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below.

What is claimed is:

1. A method of image simulation for a device manufacturing process, the method comprising:
   identifying regions of uniform optical properties from a portion or an entirety of a substrate, wherein optical properties are uniform within each of the regions;
   obtaining an image for each of the regions, wherein the image is one that would be formed from the substrate if the entirety of the substrate has the same uniform optical properties as that region;
   forming a stitched image by stitching the image for each of the regions according to locations of the regions in the portion or the entirety of the substrate; and
   forming, by a hardware computer, an adjusted image by applying adjustment to the stitched image for at least partially correcting for, or at least partially imitating an effect of, finite sizes of the regions.
2. The method of claim 1, wherein at least one of the regions comprises structures having a finite height.
3. The method of claim 1, wherein the adjusted image is an image in a resist layer on the substrate.
4. The method of claim 1, wherein a stack of structures within each of the regions is substantially uniform.
5. The method of claim 1, wherein the optical properties are dictated by one or more parameters selected from: absorbance, refractive index, thickness, composition, order, and/or reflection of structures in or under a resist layer.
6. The method of claim 1, wherein obtaining the image for each of the regions comprises retrieving the image from a database.
7. The method of claim 1, wherein the image for each of the regions is on a same image plane, and/or is obtained under same conditions apart from the substrate.
8. The method of claim 4, wherein the adjustment reflects an effect of a finite height of the structures.
9. The method of claim 1, wherein the adjustment comprises a smooth transition at boundaries between the images for the regions or an effect of scattering from edges of the regions.
10. The method of claim 1, wherein the adjustment reflects an effect of scattering from corners of the regions and/or from two adjacent edges of the regions.
11. The method of claim 1, wherein applying the adjustment comprises a convolution of a location function that represents locations of characteristics of the regions and a kernel function that represents physical effects of the characteristics.
12. The method of claim 11, wherein applying the adjustment comprises retrieving the kernel function from a database and/or calculating the location function from the substrate.
13. The method of claim 4, wherein the structures are under a resist layer on the substrate.
14. The method of claim 1, wherein the device manufacturing process is a lithography process using extreme ultraviolet radiation to expose a design layout on a patterning device to the substrate.
15. A non-transitory computer program product comprising a computer readable medium having instructions therein, the instructions, upon execution by a computer system, configured to cause the computer system to at least:
   identify regions of uniform optical properties from a portion or an entirety of a substrate, wherein optical properties are uniform within each of the regions;
   obtain an image for each of the regions, wherein the image is one that would be formed from the substrate if the entirety of the substrate has the same uniform optical properties as that region;
   form a stitched image by stitching the image for each of the regions according to locations of the regions in the portion or the entirety of the substrate; and
   form an adjusted image by applying adjustment to the stitched image for at least partially correcting for, or at least partially imitating an effect of, finite sizes of the regions.
16. The computer program product of claim 15, wherein at least one of the regions comprises structures having a finite height.
17. The computer program product of claim 15, wherein the adjusted image is an image in a resist layer on the substrate.

18. A method of image simulation for a device manufacturing process, the method comprising:
- identifying regions of uniform optical properties from a portion or an entirety of a patterning device, wherein optical properties are uniform within each of the regions;
- obtaining an image for each of the regions, wherein the image is one that would be formed from the patterning device if the entirety of the patterning device has the same uniform optical properties as that region;
- forming a stitched image by stitching the image for each of the regions according to locations of the regions in the portion or the entirety of the patterning device; and
- forming, by a hardware computer, an adjusted image by applying adjustment to the stitched image for at least partially correcting for, or at least partially imitating an effect of, finite sizes of the regions.

19. The method of claim 18, wherein at least one of the regions comprises structures having a finite height.

20. The method of claim 18, wherein the adjusted image is an image downstream of the patterning device.

21. A non-transitory computer program product comprising a computer readable medium having instructions therein, the instructions, upon execution by a computer system, configured to cause the computer system to at least:
- identify regions of uniform optical properties from a portion or an entirety of a patterning device, wherein optical properties are uniform within each of the regions;
- obtain an image for each of the regions, wherein the image is one that would be formed from the patterning device if the entirety of the patterning device has the same uniform optical properties as that region;
- form a stitched image by stitching the image for each of the regions according to locations of the regions in the portion or the entirety of the patterning device; and
- form an adjusted image by applying adjustment to the stitched image for at least partially correcting for, or at least partially imitating an effect of, finite sizes of the regions.

* * * * *